June 28, 1960 D. H. PRITCHARD 2,943,191

SIGNAL TRANSLATING SYSTEM

Filed Feb. 15, 1957 4 Sheets-Sheet 1

INVENTOR.
DALTON H. PRITCHARD

BY [signature]

ATTORNEY

INVENTOR.
DALTON H. PRITCHARD
BY
[signature]
ATTORNEY

June 28, 1960 D. H. PRITCHARD 2,943,191

SIGNAL TRANSLATING SYSTEM

Filed Feb. 15, 1957 4 Sheets-Sheet 3

INVENTOR.
DALTON H. PRITCHARD
BY
[signature]
ATTORNEY

INVENTOR.
DALTON H. PRITCHARD
BY
[signature]
ATTORNEY

United States Patent Office 2,943,191
Patented June 28, 1960

2,943,191

SIGNAL TRANSLATING SYSTEM

Dalton H. Pritchard, Princeton, N.J., assignor to Radio Corporation of America, a corporation of Delaware Filed Feb. 15, 1957, Ser. No. 640,420

18 Claims. (Cl. 250—20)

This invention relates to systems for synchronously demodulating or detecting intelligence carried by signals consisting of a carrier frequency component and associated sideband components. By way of example only, the invention is useful as a second detector in a monochrome or a color television receiver for detecting the intermediate-frequency amplitude-modulated vestigial-sideband signal. This application is a continuation-in-part of my copending application, Serial No. 632,086, filed on January 2, 1957 and entitled "Signal Translating System," now abandoned.

Synchronous detection involves the multiplication of the signal to be demodulated and a reference or demodulating oscillation having the same frequency as the carrier frequency components of the signal, and having a predetermined phase relation therewith which may be anti-quadrature, quadrature, or some other phase relation. The term "anti-quadrature phase relation" as used herein is defined as a phase relationship in the multiplying device of substantially zero degrees or substantially 180 degrees. The reference or demodulating oscillation may be generated by an oscillator which is locked in phase with the carrier component of the received signal. Alternatively, the reference or demodulating oscillation may also be generated by frequency selecting the carrier component from the received signal, amplifying and limiting the carrier component, and introducing it, together with the received signal, into a multiplying device. The present invention falls within this latter general category.

As used herein, the term "synchronous detection" includes the system wherein anti-quadrature reference oscillations are multiplied with the signal to be demodulated, and also a system wherein quadrature reference oscillations are multiplied with the signal to be demodulated, and further a system wherein reference oscillations of other phase relations are employed.

The advantages of synchronous detection, compared with conventional diode envelope detection, include reduced distortion, improved selectivity and improved noise immunity. Synchronous detection has not been used commercially to any great extent because of the relative complexity or lack of stability of known circuits capable of providing this form of demodulation.

It is therefore a general object of this invention to provide a simplified detector system which provides improved performance in the form of reduced distortion, increased sensitivity, increased selectivity and increased noise immunity.

One difficulty in achieving the advantages of synchronous detection lies in the difficulty of eliminating or preventing envelope detection in the synchronous detector circuit. Relatively expensive special purpose tubes have been resorted to for the purpose of minimizing the envelope detected components in the output.

It is therefore another object to provide synchronous detector system wherein conventional electron flow devices, such as conventional vacuum tubes, may be employed in such a way as to provide synchronous detection to the substantial exclusion of envelope detection.

It is a further object of this invention to provide a circuit, which by minor adjustment, may be made to synchronously demodulate the amplitude modulation of an input signal, or the frequency modulation of an input signal.

It is a still further object of this invention to provide an improved arrangement for demodulating an intermediate frequency vestigial sideband television signal by a circuit which provides separate luminance and chrominance signal outputs.

A demodulator circuit according to the invention may include two amplifying means or devices connected in parallel between a single ended input circuit for the signal to be demodulated and a single ended carrier frequency output circuit responsive to the frequency of the carrier frequency component of the signal to be demodulated. The two amplifying means may be constituted by two independently controllable electron streams in a common envelope. A phase splitter coupled to the carrier frequency output circuit provides two balanced differently phased carrier frequency components which are coupled back to input electrodes of the two amplifying means. A "degenerative" circuit effectively limits the fed back carrier component making it of substantially constant amplitude and degenerates the same polarity envelope detected signals in the two amplifying means. A detected signal output circuit coupled to an output electrode of at least one of the amplifying means provides a synchronously detected output signal. An alternative arrangement differs in that the two amplifying devices are connected in push-pull between an input circuit for the signal to be demodulated and a push-pull carrier frequency output circuit. The amplified carrier frequency component is then coupled back in the same phase (push-push) to input electrodes of the two amplifying means.

By way of example, one detector circuit constructed according to the teachings of the invention, and suitable for demodulating a vestigial sideband signal, includes two triode vacuum tubes having grid electrodes connected in parallel to a single ended input circuit receptive to the signal to be demodulated. The cathodes are connected to each other and to a single ended carrier frequency output circuit. A phase splitter coupled to the carrier frequency output circuit (by means providing a voltage step-up) provides two balanced oppositely phase carrier frequency signals which are coupled back in push-pull relationship to the control grids of the two tubes. The carrier frequency output circuit and phase splitter are adjusted to feed back carrier frequency signals which are in anti-quadrature phase relation, in each of the tubes, with the carrier frequency component of the input signal. That is, the phase of the fed back carrier component is the same as the phase of the received carrier component in one tube, and is opposite to the phase of the received carrier component in the other tube. The amplified carrier frequency component and the signal to be demodulated multiply in the two tubes and produce synchronously detected signals which appear in one polarity in the anode circuit of one tube, and appear in the opposite polarity in the anode circuit of the other tube.

In operation, the carrier frequency component is selected and amplified in the same tubes that are used to perform the synchronous demodulation process. This is possible because of the arrangement where in the carrier frequency component of the input signal is amplified in parallel in the two tubes. Then the amplified carrier component in the carrier frequency output circuit is fed back in push-pull to the two grids. The push-pull fed back carrier component signals applied to the grids do not appear again in further amplified form across the single ended carrier component output circuit because the opposite phases cancel in the output circuit. Therefore, there is no regenerative loop around which oscillations are established and maintained.

The amplified carrier frequency component fed back in push-pull to the grids have high peak-to-peak voltages, and the two tubes are self biased by grid current to be cut off except during peaks of the carrier component. The amount of self bias follows the average direct current component of the modulation on the input signal.

In addition to means for providing the above described self bias, a "degenerative" cathode circuit common to both tubes is employed which performs two functions. The circuit is called a "degenerative" circuit for lack of a more accurately descriptive term. The circuit causes the voltage on the cathodes to follow the amplitude modulation of the carrier frequency component fed back to the grids so that a substantially constant, or "limited," keying voltage exists between the grid and cathode in each tube. It also degenerates the undesired same-polarity envelope detected signals in the two tubes.

The "degenerative" cathode circuit common to both tubes maintains a voltage on the cathodes which follows the average between the signals on the grids of both tubes. Because of the arrangement of the two tubes, only the positive half cycles of the input signal are effective across the grid and cathode of one tube, and only negative half cycles of the input signal are effective across the grid and cathode of the other tube. Variations in the amplitude of the fed back carrier component are not effective across grid and cathode because of peak-detecting cathode follower action. Of course, the elimination of amplitude variations is not 100 percent effective but is limited by the efficiency of the cathode follower action. The equivalent of a carrier component limiting function is thus automatically performed by the "degenerative" cathode circuit.

The "degenerative" circuit also minimizes envelope detected signals. Since the characteristic curves of the two triodes include a non-linear portion, some undesired envelope detected signals may appear in the detected signal anode output circuits. Envelope detected signals result from rectification of the input signal applied in parallel to the two tubes. The envelope detected signals have the same polarity in the two tubes. The degenerative cathode circuit common to both tubes degenerates the same-polarity envelope detected signals and does not affect the opposite-polarity synchronously detected signals.

The detector circuit of this invention has been tested and found to provide all the advantages of synchronous detection. However, the explanation herein of exactly how the circuit operates to provide the extraordinary results achieved in practice is subject to modification.

There follows a more detailed description of the invention taken in conjunction with the appended drawings wherein.

Figure 1:
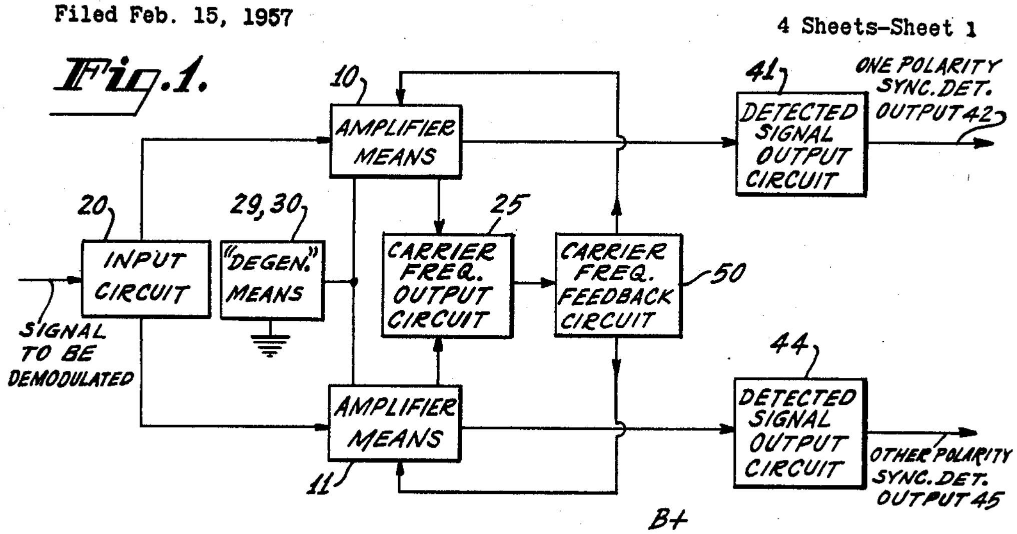
Figure 1 is a generalized block diagram of a synchronous detector system according to the invention.

Referring in greater detail to the drawings, Figure 1 is a generalized block diagram illustrative of the forms of the invention to be described. The amplifier means 10 and 11 are connected between the input circuit 20 for the signal to be demodulated and the carrier frequency output circuit 25. The carrier frequency feedback circuit 50 couples the carrier frequency component from the output circuit 25 back to input electrodes of the amplifying means 10 and 11. Oscillations are prevented because the input circuit 20 applies the signal to be demodulated in the same phase to inputs of both amplifying means 10 and 11, and the feedback circuit 50 applies the amplified signal in push-pull to inputs of the amplifying means.

According to an alternative arrangement, oscillations are prevented by constructing the input circuit 20 to apply the signal to be demodulated in push-pull to inputs of the amplifying means, and constructing the feedback circuit 50 to apply the amplified signal in the same phase to inputs of the two amplifying means. To obtain all the advantages of synchronous detection, one or both of the carrier frequency circuits 25 and 50 should be narrow band circuits tuned to the carrier frequency. For certain applications, such as demodulation of double-sideband amplitude-modulated signals, it may be sufficient to employ circuits 25 and 50 which are untuned and wideband. The term narrow band is relative with respect to the wideband signal to be demodulated. For detecting the amplitude modulation on a signal, the fed back carrier component should be in anti-quadrature phases with the input carrier component in both amplifying means. For detecting the frequency modulation on a signal, the fed back carrier component should be in quadrature phases with the input carrier component in both amplifying means. In all cases, the received signal must include some carrier frequency component. The invention is not limited to signals of any particular frequency range. For example, the invention may be used for demodulating an audio frequency modulated signal, whether amplitude modulated or frequency modulated. The input electrodes of the amplifying means may be grids and the output electrodes may be cathodes; or the input electrodes may be grids and the output electrodes may be anodes from which an amplified carrier component is fed back to cathode input electrodes. The two amplifying means 10 and 11 are connected in parallel to "degenerative" means 29, 30 which effectively limits amplitude variations of the amplified carrier frequency component fed back to the amplifier means and degenerates envelope detected signals which may be developed in the two amplifying means. Opposite polarity synchronously detected signals are available from detected signal output circuits 41 and 44.

Figure 2:
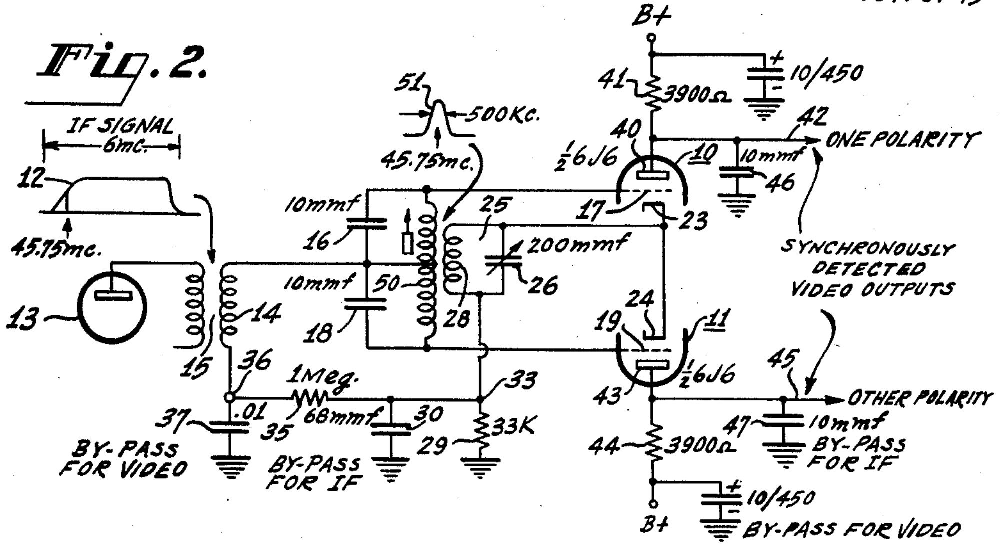
Figure 2 is a circuit diagram of a synchronous detector including a conventional dual-triode vacuum tube electron flow device.

Figure 2 is one synchronous detector circuit constructed according to the teachings of this invention and including, by way of example, circuit elements having designated values found suitable for use in demodulating an intermediate frequency vestigial-sideband television signal in a monochrome or a color television receiver. The carrier frequency component of this signal customarily has a value of 45.75 megacycles, and the unsymmetrical sideband components extend over a range of about 4 megacycles.

The circuit of Figure 2 includes two electron flow devices 10 and 11 which may, for example, be constituted by two halves of a type 6J6 dual-triode vacuum tube, or a triode-pentode tube, or by two transistors. An input intermediate-frequency signal to be demodulated, and having the frequency characteristic designated 12, is transformer coupled from an intermediate frequency amplifier 13 to the input circuit of the synchronous detector by means of a transformer 15 having a secondary coil 14. The intermediate frequency signal is coupled from the secondary coil 14, through capacitor 16 to the grid 17 of electron flow device 10, and is coupled through capacitor 18 to the grid 19 of electron flow device 11. The intermediate frequency signal is coupled in the same phase to both of the grids 17 and 19. The cathodes 23 and 24 are connected together, and through a common cathode circuit to a point of reference potential such as ground. The common cathode circuit includes a parallel resonant carrier frequency component output circuit 25 consisting of a capacitor 26 and an inductor 28, and includes in series therewith a degenerative cathode resistor 29 which is by-passed by a capacitor 30. The capacitor 30 presents a very low impedance to intermediate frequency components and presents a high impedance to demodulated video components. The junction point 33 between the resonant circuit 25 and the degenerative cathode circuit 29, 30 is connected by means of a grid self bias resistor 35 to the lower end 36 of the secondary coil 14. A capacitor 37 connects the point 36 to ground and has a value presenting a low impedance to intermediate frequency components and to detected video frequency components.

Figure 4:
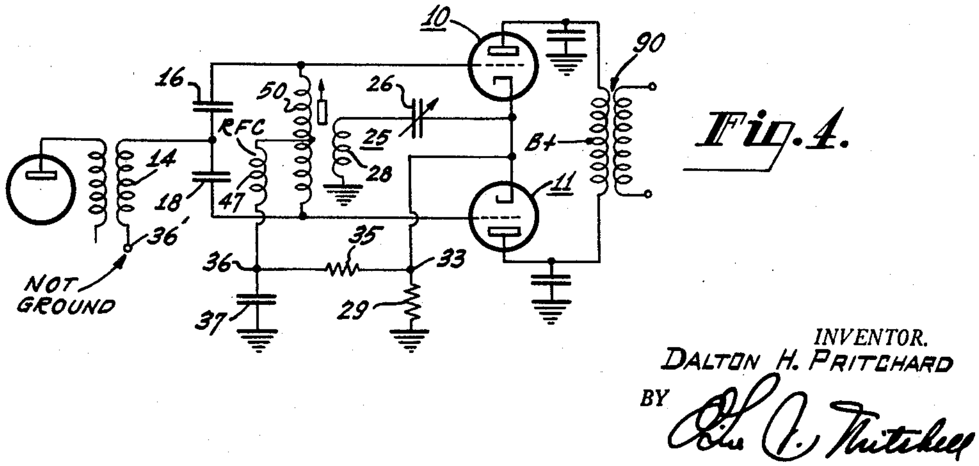
Figure 4 is a modified form of the circuit of Figure 2.
Figures 6, 8:
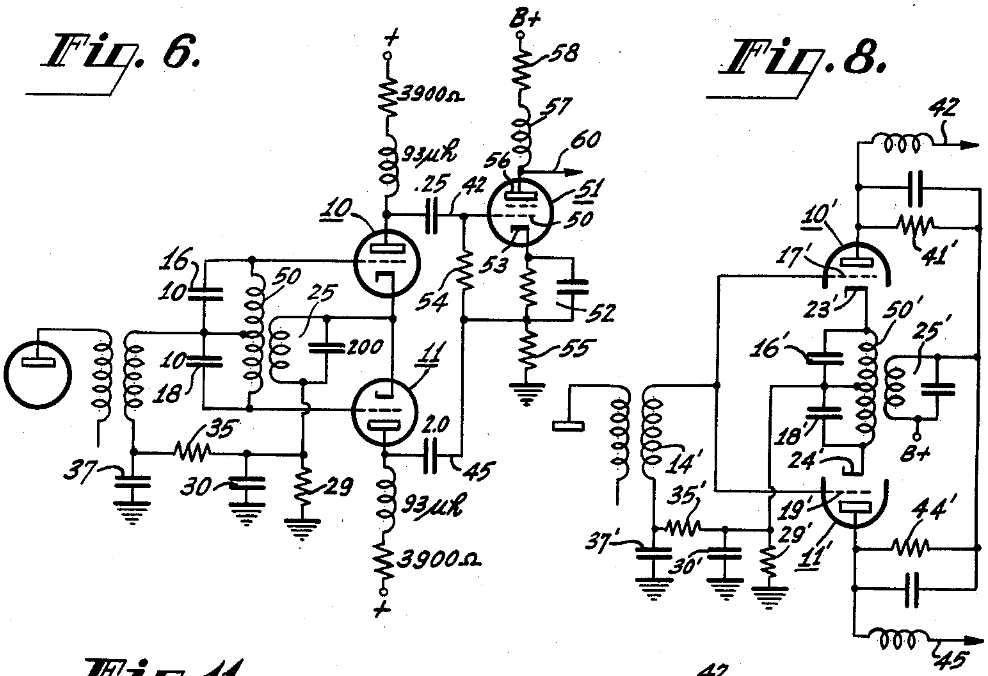
Figure 6 is a circuit diagram of a synchronous detector and amplifier system so constructed as to further degenerate envelope detected components which may reach the amplifier.
Figure 8 is a circuit diagram of a synchronous detector circuit wherein the amplified carrier frequency component is coupled from the common anode circuit of the two tubes back to the cathodes of the tubes.

The anode 40 of electron flow device 10 is connected through a load resistor 41 to the B+ terminal of a source of unidirectional potential referenced to ground. The anode 40 is also connected to a video output lead 42 which is by-passed to ground for IF by capacitor 46. The anode 43 of electron flow device 11 is connected through a load resistor 44 to a B+ terminal (normally the same B+ terminal to which resistor 41 is connected), and is connected to a detected video output lead 45 which is by-passed to ground for IF by capacitor 47. The resistor 41 and capacitor 46 constitute a detected video signal output circuit for tube 10, and the resistor 44 and capacitor 47 constitute a detected video signal output circuit for tube 11. Two equal, but opposite-polarity, synchronously detected video output signals are available on leads 42 and 45. The two outputs may, of course, be utilized independently or may be combined in push-pull fashion as illustrated in Figures 4 and 6.

It is thus far apparent that the electron flow devices 10 and 11 are connected in parallel between the single ended input circuit 14, 16, 18 for the relatively wideband intermediate frequency signal 12 to be demodulated and the relatively narrow band single-ended carrier frequency output circuit 25. The IF signal to be demodulated is applied in the same phase to both of the grids 17 and 19, and the carrier frequency components amplified in both tubes are developed in the same phase across the output circuit 25 connected to both of the cathodes 23 and 24.

The carrier frequency output circuit 25 is constructed to have a high Q and to be sharply tuned to the frequency of the IF carrier component of 45.75 megacycles. The output circuit 25 is magnetically coupled to a narrow band carrier frequency feedback circuit including a phase splitter centertapped inductor 50. The inductor 50 constitutes the secondary coil of a step-up transformer wherein inductor 28 is the primary coil. The capacitors 16 and 18 connected across the two halves of the inductor 50 serve as the coupling capacitors for the input IF signal 12 and have a value so that they cooperate with the inductor to provide a high Q circuit tuned to the input IF carrier frequency component of 45.75 megacycles. The inductors 28 and 50 may be arranged to provide an overcoupled characteristic 51 having a relatively flat topped response and a linear phase characteristic over a range of frequencies of about 500 kilocycles. However, care must be taken that the inductors 28 and 50 are not so tightly coupled that the circuit 25 loads the IF signal source and prevents the transfer of carrier component to the detector. The range of frequencies fed back is selected to be just sufficiently broad so that frequency drift of the local oscillator in the receiver does not permit the IF carrier frequency component to get outside the passband of the phase splitter coupling circuit.

The relatively narrow band of frequency components coupled from the cathodes 23 and 24 through the primary coil 28 to the secondary coil 50 provide balanced signals of opposite phase (push-pull) at the terminals of the secondary coil 50 for application to the respective control grids 17 and 19. It is thus apparent that the wideband IF signal to be demodulated is applied in the same phase (parallel or push-push) to the grids 17 and 19, and that a narrow band signal including the IF carrier frequency component is coupled in opposite phases (push-pull) to the control grids 17 and 19. The carrier frequency feed back system is tuned so that the carrier frequency component fed back to the grids is in anti-quadrature phase relation in the electron streams with the carrier frequency component of the input IF signal applied directly to the grids. That is, the carrier frequency component fed back to one of the grids is in phase with the carrier frequency component of the received IF signal, and the carrier frequency component fed back to the other grid is in phase opposition with the carrier frequency component of the input IF signal. Synchronous detection results from the multiplying of an in-phase, or a 180° out-of-phase oscillation with the signal to be demodulated. The synchronously demodulated signal resulting from in-phase mixing has a positive polarity and the synchronously demodulated signal resulting from 180 degree out-of-phase mixing has a negative polarity.

Figure 9:
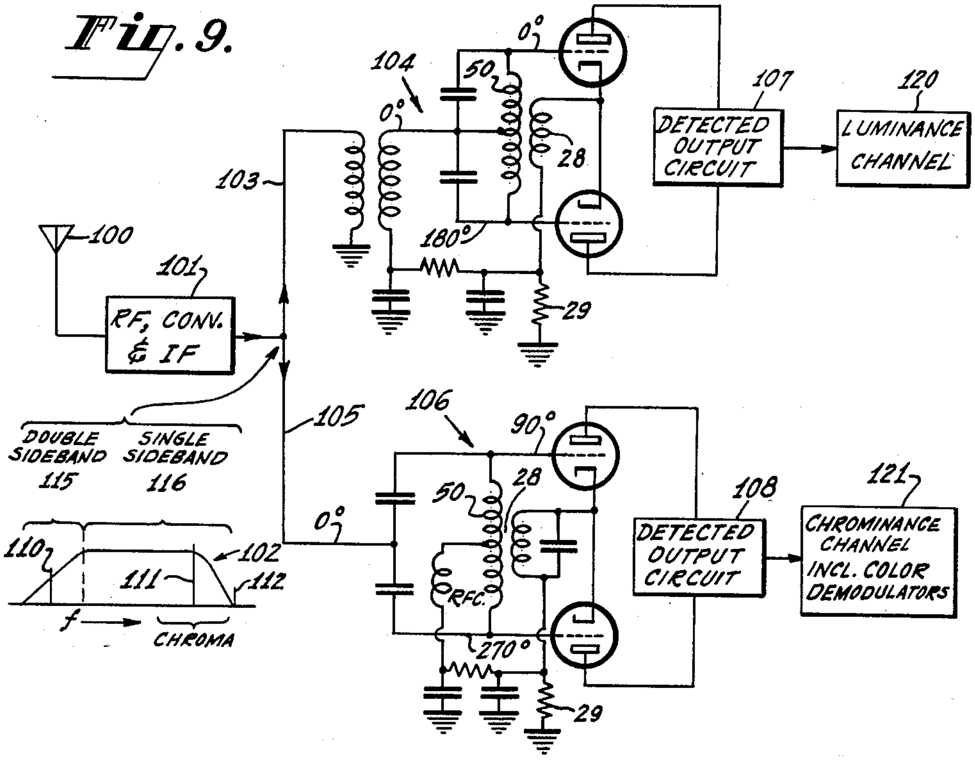
Figure 9 is a detector system useful in a color television receiver to provide separate detected luminance and chrominance signals without the disadvantages of a separation filter.

A high-performance synchronous detector system is one providing an output having negligible envelope detected signals. This has been accomplished with complex systems including means to extract the carrier frequency component from the signal to be demodulated, means to amplify the extracted carrier frequency component, means to limit the carrier frequency component, and means to linearly multiply the amplified and limited carrier frequency component with the signal to be demodulated. An example of such a system is shown in Figure 9 on page 1402 of the September 1954 issue of the Proceedings of the IRE. All the functions of these complex prior art systems are performed in the relatively very simple arrangements of this invention.

In the operation of the circuit of Figure 2, the carrier frequency component of the signal to be demodulated is extracted by the narrow band carrier frequency feed back circuit including the carrier frequency output circuit 25 and the phase splitter 16, 18, 50. Amplification of the carrier frequency component is simultaneously performed. The signal to be demodulated is applied in parallel to the two tubes and the amplified carrier frequency component generated by both tubes is developed across the carrier frequency output circuit 25. Of course, the circuit 25, being a cathode circuit, provides current amplification rather than voltage amplification. But the voltage step-up action of transformer coils 28 and 50 provides a greatly amplified voltage for application in push-pull to the grids. The primary coil 28 may have one turn and the secondary coil 50 may have ten turns.

The arrangement of the circuit is such that the same tubes can be used once for amplifying the carrier frequency component and can then be used again for synchronously detecting the input signal. This is achieved in such a manner that there is no regenerative loop around which oscillations are established and maintained. The parallel amplified carrier frequency components in the single ended output circuit 25 are fed back in push-pull to the grids. The twice amplified carrier frequency components in the two tubes appear in opposite cancelling phases across the output circuit 25. Therefore, the twice amplified push-pull carrier frequency components are not again fed back to the grids. Amplification is achieved without regenerative oscillations.

High performance synchronous detection requires the amplitude limiting of the amplified carrier frequency component, or its equivalent. The carrier frequency component in the received signal to be demodulated fluctuates considerably in amplitude in accordance with the modulating signal. The equivalent of carrier component limiting is achieved in the circuit of Figure 1 as follows: The high peak-to-peak voltage carrier component, fed back to the grids in push-pull fashion, cause a high self bias to be developed across bias resistor 35. The two tubes are thus self biased to be cut off except during peaks of the carrier component. The grid current of both tubes flows in the same direction (at alternate time periods) through the self bias resistor 35. The grid self bias voltage generated adjusts itself to the average D.C. amplitude of the modulation on the fed back carrier component. Of course, fixed bias may be employed in place of self bias, if desired.

In addition to the self bias provided by resistor 35, there are two effects produced by the "degenerative" cathode circuit 29, 30. First, the circuit causes the cathodes to follow the amplitude variations of the carrier frequency component fed back to the grids so that the equivalent of a constant amplitude, or limited, keying voltage is obtained. Second, the circuit degenerates same-polarity undesired envelope detected signals in the two tubes.

The "degenerative" cathode circuit 29, 30 responds to the currents from the two tubes in such a way that the voltage on the cathodes follows the video modulation on the amplified carrier component fed back to the grids. This video modulation includes frequency components, in the present example, up to about 250 kilocycles because of the narrow bandwidth of the feedback circuit. In contrast, the video modulation on the broadband received signal includes frequency components up to about four megacycles.

Figure 3:
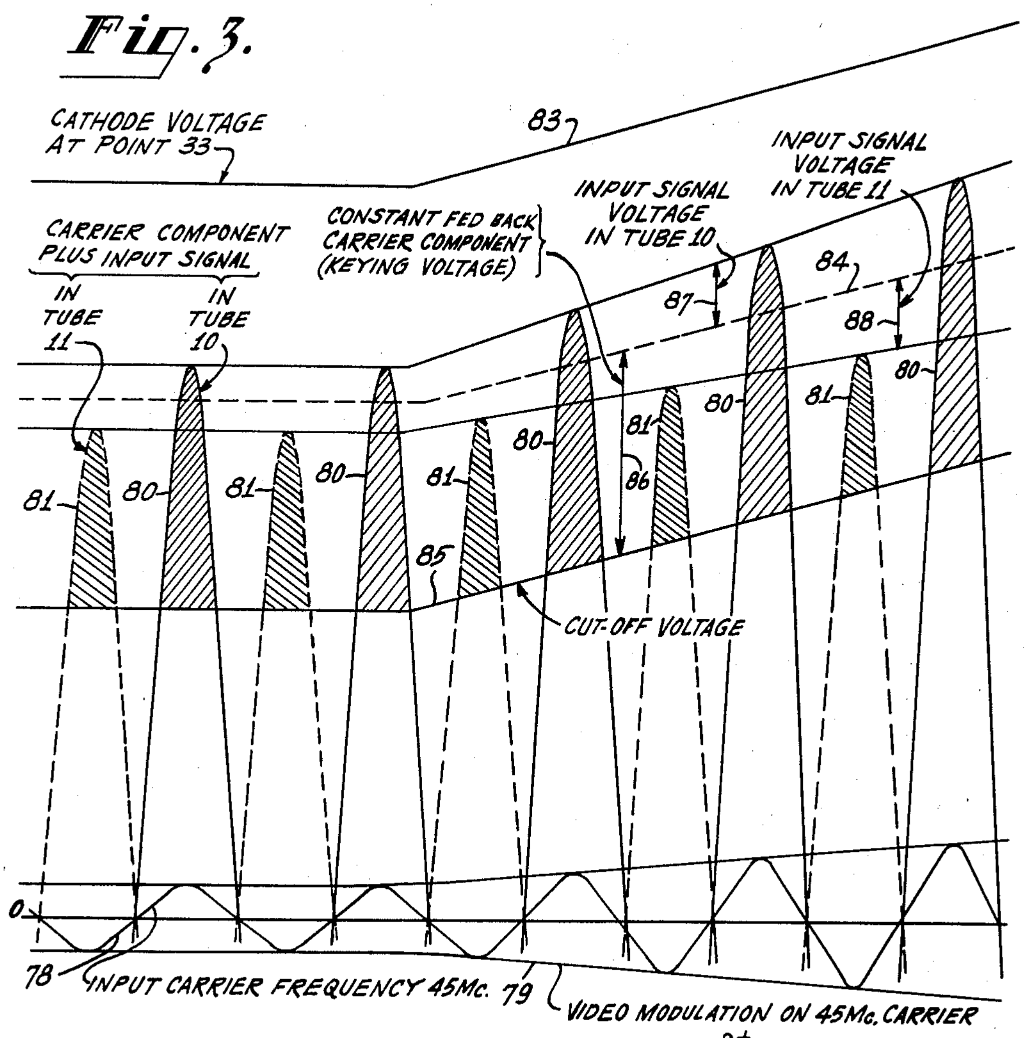
Figure 3 is a chart of waveforms which will be referred to in describing the operation of the circuit of Figure 2.

An understanding of the manner in which the cathodes are made to follow the amplitude variations of the amplified carrier component fed back to the grids may be had by reference to the waveform chart of Figure 3. The input signal applied in parallel to both tubes is represented by the carrier frequency wave 78 which is modulated with an envelope 79 corresponding with the video signal to be detected. Half cycles 80 represent the sum of the amplified carrier component and the input signal applied to the control grid 17 of tube 10. Half cycles 81 represent the sum (obtained by subtraction because of the phases) of the amplified carrier component and the input signal applied to the control grid 19 of tube 11. The current flowing from both tubes through the cathode resistor 29 develops a cathode voltage at point 33 as represented by the waveform 83. The 45 megacycle component due to the higher amplitude half cycles 80 interleave with the lower amplitude half cycles 81 is present in the cathode output circuit 25 but is bypassed from point 33 to ground by capacitor 30. The waveform 83 at point 33 is parallel to the average level 84 of the half cycles 80 and 81. It will be noted that, going from left to right, as the amplitude of the input signal 78, 79 increases, the amplitudes of half cycles 80 increase correspondingly, but the half cycles 81 decrease in proportion, so that the average line 84 follows the input modulation. The line 85 representing cut-off voltage in both tubes is parallel with the curve 83 for cathode voltage at point 33 and curve 84 for average half cycle amplitude at the grids of the two tubes. The shaded portions of each half cycle represent conduction in the respective tubes. The distance 86 between the cut off voltage 85 and the average peak voltage 84 on the two grids is constant. This represents the constant amplitude carrier component fed back to the grids to serve as an amplitude "limited" keying voltage. The distance 87 represents the input signal in tube 10, and the distance 88 represents the input signal in tube 11. It is thus apparent that the cathode circuit common to the two tubes provides a cathode waveform which varies with the video modulation so that the amplified and fed back carrier component actually effective between grid and cathode is always substantially constant. Thus the essential limiting of the keying voltage is automatically performed in the circuit of Figure 2.

High performance synchronous detection also requires a linear device for multiplying the signal to be demodulated with an amplified and limited carrier component. Complex special purpose devices have been used for this purpose. The circuit of this invention, as illustrated in Figure 1, can employ a conventional dual-triode vacuum tube such as the type 6J6. The characteristic curves of conventional vacuum tubes include a non-linear portion. Therefore some undesired envelope detected signals may appear on leads 42 and 45 from the detected signal anode output circuits. Envelope detected signals result from rectification of the input signal applied in parallel to the two tubes. Therefore, the envelope detected signals have the same polarity in the two tubes. The same polarity envelope detected signals are degenerated by the degenerative cathode resistor 29. This is the second function performed by the "degenerative" circuit. The resistor 29 is bypassed by capacitor 30 for the frequencies of the IF signal to be demodulated, and capacitor 30 provides a high impedance for the frequencies of the video detected signals. Since the envelope detected signal currents from both tubes are of the same polarity, they add together in the degenerative cathode resistor 29 and substantially prevent envelope detected signals from appearing on detected output leads 42 and 45. On the other hand, the synchronously detected signal currents in the two tubes are of opposite polarity so they do not develop a degenerative voltage across resistor 29. Therefore, the same-polarity envelope detected signals are degenerated and the opposite-polarity synchronously detected signals are unaffected by the "degenerative" circuit.

An automatic gain control signal can be derived from point 33 by means of a circuit for translating the voltage from a positive value to a negative value, and for filtering out the high frequency modulation components. The resulting negative AGC voltage follows the signal strength of the signal applied to the input of the synchronous detector. The AGC voltage, being derived principally from the amplified carrier frequency signal, is of high amplitude and does not require further amplification. The AGC voltage is also relatively noise immune because of the relatively very narrow bandwidth of the carrier frequency signal from which it is derived. A circuit for deriving an AGC voltage is included in Figure 11.

Figure 4 shows a synchronous detector circuit similar to that of Figure 2 and bearing the same reference numerals for corresponding circuit elements. In the circuit of Figure 4, the point 36 is connected through a radio frequency choke 47 to the centertap on inductor 50. This arrangement differs from that of Figure 2 wherein the point 36 is connected to the lower end of secondary coil 14. The arrangement of Figure 4 is useful when it is desired to A.-C. couple the input signal to the detector because the point 36' is not at ground potential.

Figure 4 also illustrates the use of a carrier component output circuit 25 including a capacitor 26 and inductor 28 in a series tuned arrangement, rather than a parallel tuned arrangement as shown in Figure 2. The circuit of Figure 4 is easier to tune to provide anti-quadrature feedback, and the circuit of Figure 2 is easier to tune to provide quadrature feedback.

Figure 4 further illustrates the combination of the opposite polarity outputs of the two tubes by means of a push-pull output transformer 90. Any one of the three modifications illustrated in Figure 4 may be applied to the circuit of Figure 2.

Figure 5:
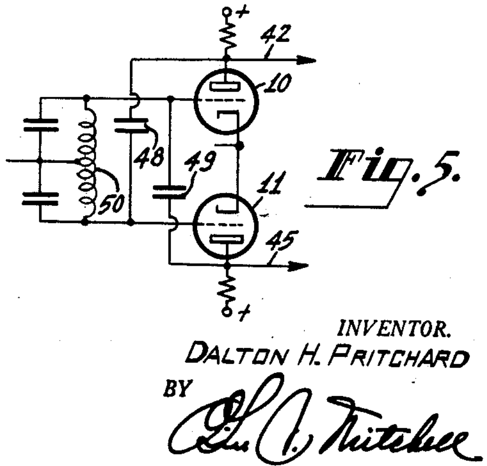
Figure 5 illustrates the connections of two neutralizing capacitors which may be added to the circuits of Figures 2 and 4 for the purpose of preventing self-oscillation in the detector circuit.

The synchronous detectors of this invention are intended to operate in a non-oscillating manner. If any of the circuits are found in practice to have a tendency to oscillate, due to lack of balance between the circuits of the two tubes, this can be prevented by cross-connecting two neutralizing capacitors 48 and 49, as shown in Figure 5, between the grids and anodes of the two tubes.

Figure 6 shows a synchronous detector circuit similar to that of Figure 1 in combination with an amplifier for the detected video signal. In Figure 6, the synchronously detected video signal of positive polarity on lead 42 is applied to the control grid 50 of the amplifier vacuum tube 51, and the synchronously detected signal of negative polarity on lead 45 is applied through the cathode bias circuit 52 to the cathode 53 of the tube 51. A load resistor 54 is connected between the leads 42 and 45. A cathode resistor 55 is connected from lead 45 to ground. The anode 56 of tube 51 is connected through a video peaking coil 57 and an anode resistor 58 to a B+ terminal of a source of unidirectional current. An amplified video signal is obtained on output lead 60.

In the operation of the arrangement of Figure 6, any undesired envelope detected signal components which may exist on leads 42 and 45 are of the same polarity, and are applied to both the control grid 50 and the cathode 53 of the amplifier tube. Therefore the envelope detected signals cause substantially no voltage difference between the grid and cathode and are not amplified by the amplifier tube 51. On the other hand, the synchronously detected signals on leads 42 and 45 are of opposite polarity so that when they are applied to the control grid and cathode, respectively, they produce a combined voltage difference between the grid 50 and cathode 53. The synchronously detected signal is therefore amplified in the amplifier tube to the exclusion of the envelope detected signals. It will be understood that the arrangement of Figure 6 serves to cancel any envelope detected signals not completely eliminated by the arrangements previously described in connection with Figure 1. When the arrangement of Figure 6 is employed, the degree of balance in the detector can be relaxed because the envelope detected signals are cancelled in the input to the video amplifier 51. Another advantage of the arrangement of Figure 6 is that the envelope detected outputs of both tubes are combined in push-pull fashion for application to the video amplifier. This provides a higher detected output from the detector circuit.

Figure 7:
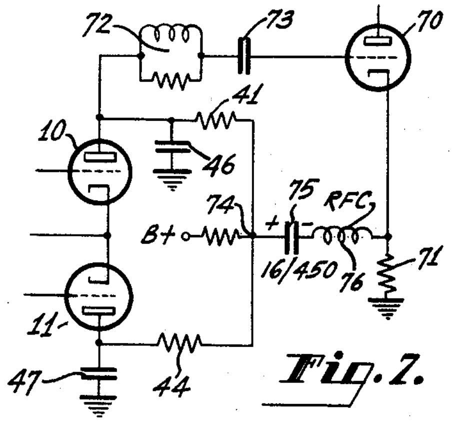
Figure 7 illustrates the coupling of the output of the synchronous detector to a bootstrapped amplifier.

Figure 7 illustrates how the output of the phase detector circuit can be coupled to a following amplifier 70 to provide bootstrap operation of the amplifier. Bootstrap operation of an amplifier is obtained by feeding the input signal between grid and cathode, rather than between grid and ground. By this arrangement, additional gain is obtained from the voltage drop across the cathode resistor 71. Bootstrapping is possible only when the input signal source is not referenced to ground. A positive synchronously detected signal from the anode of tube 10 is applied through a video peaking circuit 72 and a coupling capacitor 73 to the grid of amplifier tube 70. The B+ ends of the anode resistors 41 and 44 are connected together to provide an ungrounded terminal 74 which is coupled through electrolytic capacitor 75 (which passes detected signal components) and radio frequency choke 76 (which blocks IF signals) to the cathode of amplifier tube 70. Bootstrap amplified signals can be taken from the anode, and/or from the cathode, of tube 70.

Figure 8 shows a synchronous detector circuit according to the invention wherein the narrow band phase splitter coupling circuit for feeding back the narrow band signal including the IF carrier frequency component is arranged so that the carrier frequency output circuit is in the anode circuits of the two tubes and the phase splitter provides push-pull fed back carrier components to the cathodes of the two tubes. The previously described arrangements include a carrier frequency feedback circuit coupled from the cathodes to the control grids. It will be understood that in all cases, the phase splitter coupling circuit is connected from output electrodes of the two tubes back to input electrodes of the two tubes. In Figures 2 and 4, the cathodes constitute output electrodes, and the control grids constitute input electrodes. The cathodes, of course, are common to both input and output circuits and are therefore both output electrodes and input electrodes. In the arrangement of Figure 8 the anodes are output electrodes from which narrow band signals are fed back to the cathode input electrodes. In all cases, the anodes are output electrodes for the detected output signals.

In Figure 8, circuit elements are given the same numeral as corresponding elements in Figure 2, with prime designations added. In the operation of the circuit of Figure 8, the wide band signal to be demodulated is applied directly to both of the control grids 17' and 19'. The amplified carrier frequency component developed in anode output circuit 25' is coupled back through the phase splitting circuit 50', 16', and 18' to respective cathodes 23' and 24'. In other respects, the operation of the circuit of Figure 6 is the same as has been described in connection with the circuit of Figure 2.

The arrangement of Figure 2, wherein the carrier frequency component is coupled from the cathodes back to the grids is advantageous because it involves the coupling from a low impedance point to a high impedance point with the result that the transformer including primary inductor 28 and secondary inductor 50 constitutes a voltage step-up transformer. In Figure 8, the reverse situation obtains in coupling from the high impedance anodes to the low impedance cathodes. The arrangement of Figure 2 is therefore preferred over the arrangement of Figure 8.

The circuits of Figures 1, 2 and 4 through 8 have been described as synchronous detectors for detecting the anti-quadrature (usually called in-phase) component of an input signal. The amplitude modulation on a vestigial side-band signal is detected by an anti-quadrature synchronous detector. The frequency modulation on a vestigial side-band input signal, or a frequency modulated input signal, is detected by quadrature synchronous detection. The circuits of Figures 1, 2 and 4 through 8 can be tuned to operate as either an anti-quadrature synchronous detector or a quadrature synchronous detector. As has been described, anti-quadrature detection is obtained by tuning primary coil 28 and the secondary coil 50 of the carrier component feedback circuit so that the carrier component fed back to one grid is in phase with the carrier component of the input signal, and the carrier component fed back to the other grid is in phase opposition with the carrier component of the input signal. On the other hand, quadrature detection is obtained with the same circuits by tuning the primary coil 28 and the secondary coil 50 so that the carrier component fed back to one grid is in phase quadrature with the carrier component of the input signal, and the carrier component fed back to the other grid is in the opposite phase quadrature with the carrier component of the input signal. The tuning is performed so that the stated phase relationships exist in the electron streams of the vacuum tubes 10 and 11. It is therefore apparent that the circuits of this invention are also useful for demodulating a frequency modulated signal.

Figure 10:
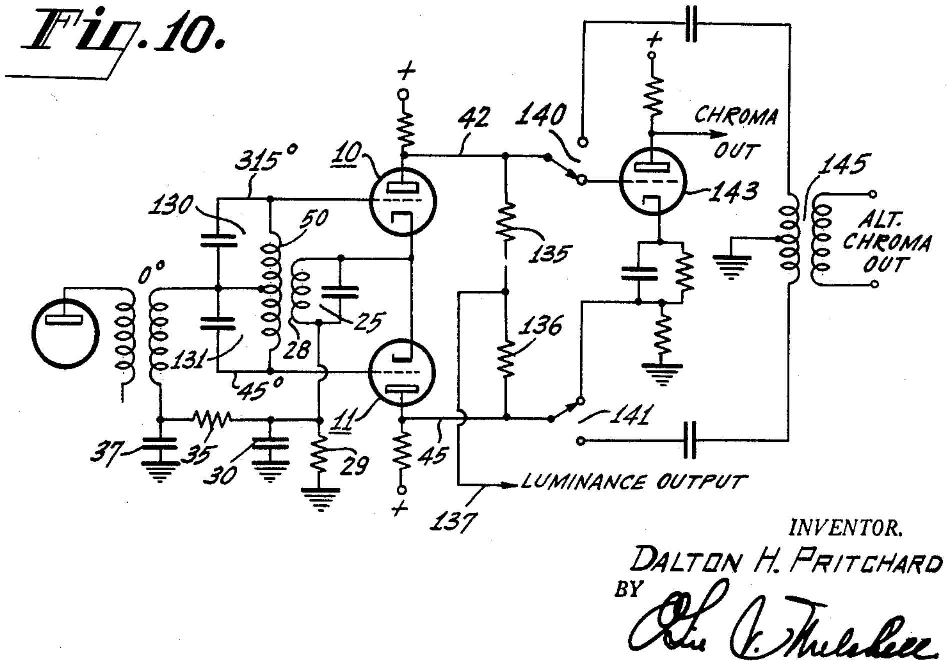
Figure 10 is a simplified circuit performing the functions of the system of Figure 9.

Figures 9 and 10 show a portion of a color television receiver employing two detector circuits for detecting the IF television signal and also performing the function of separating the chrominance and luminance portions of the detected video signal. This separation function is performed without the use of filters, and therefore without the frequency-dependent phase delay inherent in a filter. Consequently, a television receiver including the arrangement of Figure 9 does not need the usual delay means in the luminance channel to compensate for the delay inherent in the usual chroma separation filter.

In Figure 9, a color television signal received by antenna 100 is applied to the usual circuit 101 including a radio frequency amplifier, a converter, and an intermediate frequency amplifier. The IF output of circuit 101 has the frequency distribution 102 and is applied by lead 103 to a luminance detector 104, and is applied by lead 105 to a chrominance detector 106. The feedback circuit in the luminance detector 104 is tuned to provide anti-quadrature synchronous detection, and the feedback circuit in the chrominance detector 106 is tuned to provide quadrature synchronous detection. A detected luminance signal is providede by the output circuit 107 and a detected chrominance signal is provided by the output circuit 108.

The operation of the system of Figure 9 in separating luminance and chrominance depends on the nature of the input IF signal having the frequency distribution 102 with the IF carrier component at 110, and including chroma components about a suppressed color subcarrier frequency 111, and including a frequency modulated aural carrier 112. It will be noted that, with reference to the IF carrier 110, there is a double sideband region 115, and an entirely single sideband region 116. A vestigial sideband signal is a carrier component which is both amplitude and frequency modulated, that is, a carrier component having both anti-quadrature ("in-phase") modulation and quadrature modulation. The anti-quadrature component in the double sideband region 115 is relatively large, and the quadrature component in the single sideband region 116 is relatively large. Therefore, the anti-quadrature detector 104 detects the anti-quadrature component and provides the luminance or brightness information, while the quadrature detector 106 detects the quadrature component including the chrominance information. The band pass characteristics of the luminance channel 120 is made to cut off for frequencies at and above the color subcarrier frequency 111. The output circuits of the color demodulators in the chrominance channel 121 is designed to cut off at frequencies below the chroma frequency range.

Figure 10 shows a single detector circuit tuned in such a way as to provide separate luminance and chrominance detected output signals. In Figure 10, the transformer primary circuit 25 and the two portions 130 and 131 of the secondary circuit are tuned so that the carrier component fed back to the grid of tube 10 is at 315 degrees with relation to the input carrier component, and the carrier component fed back to the grid of tube 11 is at 45 degrees with relation to the input carrier component. The fed back carrier components are therefore in intercardinal phases with relation to the input carrier component. The signal detected at 315 degrees in the output of tube 10 is added to the signal detected at 45 degrees in the output of tube 11 by means of equal resistors 135 and 136 to provide an anti-quadrature phase (luminance) signal on lead 137.

A qradrature phase (chrominance) signal is obtained by subtracting the output of tube 10 from the output of tube 11. Two methods of doing this are shown in Figure 10. If the switches 140 and 141 are in the positions shown, the subtraction is performed in the chroma amplifier tube 143. If the switches 140 and 141 are in the other positions, the subtraction is performed in the transformer 145. One or the other, not both, of the chroma output arrangements shown may be used.

The presently preferred forms of the invention have been described, with references to Figures 1 through 10, as including means for applying the signal to be demodulated to both amplifying devices in the same phase, and means for feeding back the amplified carrier frequency signal to the two amplifying devices in push-pull, or in opposite phases. By this arrangement, the amplified carrier frequency component does not again appear in the feedback path to be reamplified and cause oscillation. The same result is achieved by the alternative arrangement illustrated in Figure 11 wherein the signal to be demodulated is applied in push-pull to both amplifying devices and the amplified carrier frequency component is fed back in the same phase to both of the two devices.

Figure 11:
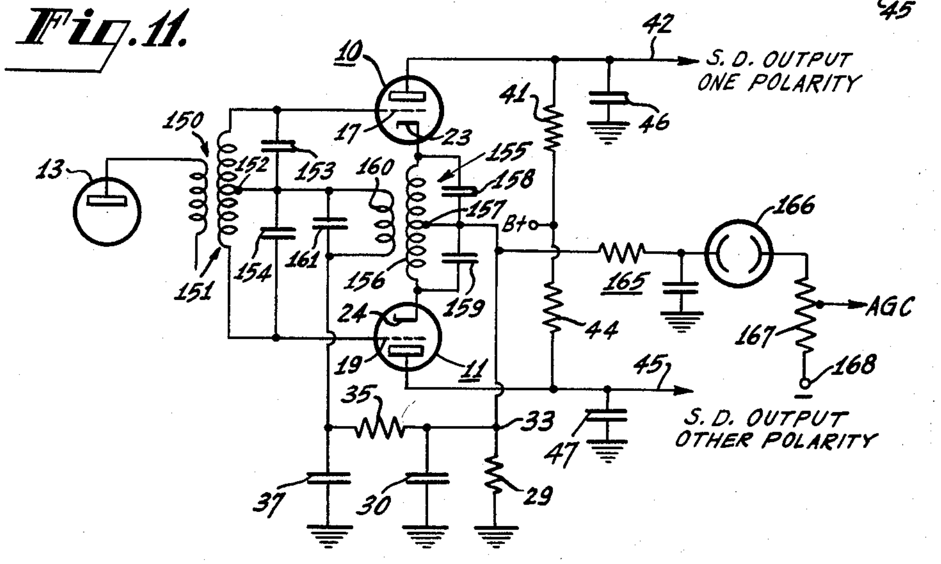
Figure 11 is a circuit diagram of a synchronous detector wherein the signal to be detected is applied in push-pull to the two amplifying devices and the amplified carrier frequency component is fed back in the same phase to both amplifying devices.

Referring in greater detail to Figure 11, wherein elements corresponding to elements in Figure 2 are given the same reference numerals, the signal to be demodulated is coupled from amplifier stage 13 through transformer 150 to the grids 17 and 19 of vacuum tubes 10 and 11. Since the terminal ends of the secondary coil 151 are connected to the grids and the centertap 152 is referenced to ground so far as the input radio frequency signal is concerned, the signal to be demodulated is applied in push-pull, or in opposite phases, to the grids of the two tubes. The secondary coil 151 is tuned by capacitors 153 and 154 to provide the desired frequency response characteristics. The cathodes 23 and 24 are connected to the terminal ends of a push-pull output circuit 155 which includes a coil 156 with a centertap 157 and capacitors 158 and 159. The centertap 157 is also referenced to ground so far as the radio frequency signal is concerned.

The amplified signal in output circuit 155 is coupled in the same phase, or in single-ended fashion, back to the grids 17 and 19 by means of a secondary coil 160 tuned by a capacitor 161. One end of the circuit 160, 161 is referenced to ground and the other end is connected to the centertap 152 from which similar paths are provided by elements 151, 153 and 154 to the grids 17 and 19. Preferably, at least one of the output circuit 155 and the feedback circuit 160, 161 is tuned to pass a relatively narrow band of frequencies including the carrier frequency component of the input signal. If amplitude detection is desired, the circuits are adjusted so that the input signal and the fed back signal are in different anti-quadrature phase relations in the two tubes. If frequency detection is desired, the circuits are adjusted so that the two signals are in different quadrature relations in the two tubes. It will be understood that, except for the transposition of the push-pull and parallel signals, Figure 11 is analogous to Figure 2, and that modifications illustrated and described in connection with Figures 3 through 10 may also be applied to the circuit of Figure 11.

Figure 11 also illustrates the deriving of an automatic gain control voltage from the point 33 by means 165 for isolating and filtering out the high modulation frequencies, a voltage dropping neon tube 166, a resistor 167, and a negative terminal 168 of a source of direct current.

It is apparent that according to this invention there is provided a relatively simple, inexpensive, and reliable means for obtaining synchronously detected signals to the substantial exclusion of envelope detected signal components.

What is claimed is:

1. Means to demodulate a modulated input signal including a carrier frequency component and sideband components, comprising, two amplifying means having inputs and outputs, means to apply said input signal in the same phase to inputs of both of said amplifying means, means to derive a combined amplified output in the same phase from outputs of both of said amplifying means, means to apply said amplified output in different balanced phases back to inputs of said two amplifying means by circuitry devoid of an oscillation sustaining feedback loop, degenerative means by-passed for carrier frequency components, means coupling said amplifying means in parallel with said degenerative means to degenerate variations having modulation frequency components and having the same polarity in the two amplifying means, and means to derive a synchronously detected output from at least one of said amplifying means.

2. Means to demodulate a wideband input signal including a carrier frequency component and sideband components, comprising, an input circuit for the signal to be demodulated, a narrow band carrier frequency output circuit tuned to said carrier frequency, two amplifying means coupled in parallel between said input and output circuits, a phase splitter having an input coupled to said output circuit and having two outputs coupled back in anti-quadrature push-pull to said two amplifying means, degenerative means coupled to both of said amplifying means to degenerate variations having the same polarity in the two amplifying means, and a detected signal output circuit coupled to at least one of said amplifying means, said demodulating means being devoid of an oscillation sustaining feedback loop.

3. Means to demodulate an input signal including a carrier frequency component and sideband components, comprising an input circuit for the signal to be demodulated, an output circuit tuned to said carrier frequency, two amplifying means coupled in parallel between said input and output circuits, a phase splitter having an input coupled to said output circuit and having two outputs coupled back in different phases to said two amplifying means, degenerative means coupled to both amplifying means, and means to derive a synchronously detected output from at least one of said amplifying means, said demodulating means being devoid of an oscillation sustaining feedback loop.

4. Means to demodulate a modulated input signal including a carrier frequency component and sideband components, comprising, an input circuit for the signal to be demodulated, an output circuit tuned to said carrier frequency, two amplifying means coupled in parallel between said input and output circuits, a phase splitter having an input coupled to said output circuit and having two outputs coupled back in different phases to said two amplifying means, degenerative means providing a low impedance to carrier frequency components and a high impedance to modulation frequency components, means coupling said two amplifying means in parallel to said degenerative means, and means to derive a synchronously detected output from at least one of said amplifying means, said demodulating means being devoid of an oscillation sustaining feedback loop.

5. Means to demodulate an input signal including a carrier frequency component and sideband components, comprising, an input circuit for the signal to be demodulated, an output circuit tuned to said carrier frequency, two amplifying means each having a cathode, a grid and an anode, means coupling said grids in parallel to said input circuit, means coupling said cathodes in parallel to said output circuit, a phase splitter having an input coupled to said output circuit and having two outputs coupled back in push-pull to the grids of said two amplifying means, a degenerative cathode circuit common to both amplifying means, and means to derive a synchronously detected output from the anode of at least one of said amplifying means, said demodulating means being devoid of an oscillation sustaining feedback loop.

6. Means to demodulate an amplitude modulated input signal including a carrier frequency component and sideband components, comprising, an input circuit for the signal to be demodulated, a carrier frequency output circuit tuned to said carrier frequency, two amplifying means coupled in parallel between said input and output circuits, a phase splitter having an input coupled to said output circuit and having two outputs coupled back in push-pull to said two amplifying means, said fed back carrier frequency component being in anti-quadrature phase with the carrier frequency component of the input signal in the amplifying means, means coupled to both of said amplifying means to degenerate signals of the same polarity in the two amplifying means, and means to derive a synchronously detected output from at least one of said amplifying means said demodulating means being devoid of an oscillation sustaining feedback loop.

7. Means to demodulate an amplitude modulated input signal including a carrier frequency component and sideband components, comprising, an input circuit for the signal to be demodulated, a carrier frequency output circuit tuned to said carrier frequency, two amplifying means each having a cathode, a grid and an anode, means coupling said grids in parallel to said input circuit, means coupling said cathodes in parallel to said output circuit, a phase splitter having an input coupled to said output circuit and having two outputs coupled back in push-pull to the grids of said two amplifying means, said fed back carrier frequency component being in anti-quadrature phase with the carrier frequency component of the input signal in the amplifying means, degenerative means coupled to said cathodes to degenerate signals having the same polarity in the two amplifying means, and means to derive a synchronously detected output from the anode of at least one of said amplifying means, said demodulating means being devoid of an oscillation sustaining feedback loop.

8. Means to demodulate an input signal including a carrier frequency component and sideband components, comprising, an input circuit for the signal to be demodulated, an output circuit tuned to said carrier frequency, two amplifying means coupled in parallel between said input and output circuits, a phase splitter having an input coupled to said output circuit and having two ouputs coupled back in push-pull to said two amplifying means, said feed back carrier frequency component being in anti-quadrature phase with the carrier frequency component of the input signal in the amplifying means, degenerative means coupled to both of said amplifying means to degenerate variations having the same polarity in the two amplifying means, a third amplifying means having two input electrodes, and means to apply detected output signals from said first two amplifying means in push-pull to respective ones of said two input electrodes of said third amplifying means, said demodulating means being devoid of an oscillation sustaining feedback loop.

9. Means to demodulate the quadrature component of an input signal including a carrier frequency component and sideband components, comprising, an input circuit for the signal to be demodulated, an output circuit tuned to said carrier frequency, two amplifying means coupled in parallel between said input and output circuits, a phase splitter having an input coupled to said output circuit and having two outputs fed back in push-pull to said two amplifying means, said fed back carrier frequency component being in quadrature phase with the carrier frequency component of the input signal in the amplifying means, means coupled to both amplifying means to degenerate detected signals of the same polarity in the two amplifying means, and means to derive a synchronously detected output from at least one of said amplifying means, said demodulating means being devoid of an oscillation sustaining feedback loop.

10. Means to demodulate an input signal including a carrier frequency component and sideband components extending over a given range of frequencies, comprising, two electron flow devices each having input electrodes including a common electrode and having output electrodes including said common electrode, means to apply said input signal in the same phase to input electrodes of both of said devices, a relatively narrow-band circuit tuned to the frequency of said carrier component, means to couple corresponding output electrodes of said two devices in parallel to said narrow band circuit, phase splitter means to apply the carrier frequency component in said narrow band circuit in opposite phases to corresponding input electrodes of said two devices, one of said opposite phases being the same as the phase of said carrier frequency component of the input signal, a degenerative circuit coupled to said common electrodes of the two devices to degenerate the two same-polarity envelope detected components and to degenerate amplitude variations of the fed back carrier component, and means coupled to an output electrode of at least one of said devices to provide the synchronously detected component, said demodulating means being devoid of an oscillation sustaining feedback loop.

11. Means to demodulate a modulated input signal including a carrier frequency component and sideband components extending over a given range of frequencies, comprising, two electron flow devices each having input electrodes including a control electrode and a common electrode and having output electrodes including said common electrode, a wide-band circuit tuned to accommodate said range of frequencies, said circuit including a center-tapped inductor and two capacitors connected in series between the ends of said inductor, means to apply said input signal to the junction between said capacitors, means coupling the ends of said inductor to the control electrodes of respective ones of said devices, a relatively narrow band circuit tuned to the frequency of said carrier component and including a second inductor, means to couple corresponding output electrodes of said two devices in parallel to said narrow band circuit, said second inductor being magnetically coupled with said centertapped inductor, whereby the signal in said narrow band circuit is coupled in opposite phases to the control electrodes of said two devices, said circuits being adjusted so that one of said opposite phases is the same as the phase of said carrier frequency component of the input signal, whereby two same-polarity envelope detection components and two opposite-polarity synchronous detection components are developed by said two devices, a degenerative circuit coupled to said common electrodes of the two devices to degenerate modulation frequency components of the same polarity in the two devices, and means coupled to an output electrode of at least one of said devices to provide the synchronous detection component, said demodulating means being devoid of an oscillation sustaining feedback loop.

12. Means to demodulate a modulated input signal including a carrier frequency component and sideband components, comprising, an input circuit for the signal to be demodulated, an output circuit tuned to said carrier frequency, two amplifying means having input electrodes coupled in parallel to said input circuit and having other corresponding electrodes coupled in parallel to said output circuit, a phase splitter having an input coupled to said output circuit and having two outputs coupled back in different balanced phases to input electrodes of said two amplifying means, degenerative means by-passed for the carrier frequency component and coupled to two corresponding electrodes of the two amplifying means to degenerate variations having modulation frequency components and having the same polarity in the two amplifying means, and means to derive a synchronously detected output from an electrode of at least one of said amplifying means, said demodulating means being devoid of an oscillation sustaining feedback loop.

13. A synchronous detector for demodulating a modulated input signal including a carrier frequency component and sideband components, comprising, two amplifying means each having input terminals and output terminals, a first coupling circuit arranged to couple said input signal to input terminals of both of said amplifying means, an output circuit coupled to output terminals of both of said amplifying means to provide an amplified signal including at least the carrier frequency component of said input signal, a second coupling circuit arranged to couple said amplified signal from said output circuit to input terminals of both of said amplifying means, at least one of said output and said second coupling circuits being sharply tuned to said carrier frequency, one of said first and second coupling circuits being constructed to couple the corresponding signal in the same phase to both of the amplifying means, and the other of said coupling circuits being constructed to couple the corresponding signal in opposite phases to the two amplifying means, said second coupling circuit being additionally constructed to couple the amplified signal to the amplifying means so that the amplified signal and the input signal are in anti-quadrature phase relation in both amplifying means, degenerative means coupled to both of said amplifying means to degenerate variations having the same polarity in the two amplifying means, and means to derive a synchronously detected output signal from an output terminal of at least one of said amplifying means, said synchronous detector being devoid of an oscillation sustaining feedback loop.

14. A synchronous detector for demodulating a modulated input signal including a carrier frequency component and sideband components, comprising, two amplifying means each having input terminals and output terminals, a first coupling circuit arranged to couple said input signal to input terminals of both of said amplifying means, an output circuit coupled to output terminals of both of said amplifying means to provide an amplified signal including at least the carrier frequency component of said input signal, a second coupling circuit arranged to couple said amplified signal from said output circuit to input terminals of both of said amplifying means, at least one of said output and said second coupling circuits being sharply tuned to said carrier frequency, one of said first and second coupling circuits being constructed to couple the corresponding signal in the same phase to both of the amplifying means, and the other of said coupling circuits being constructed to couple the corresponding signal in opposite phases to the two amplifying means, said second coupling circuit being additionally constructed to couple the amplified signal to the amplifying means so that the amplified signal and the input signal are in quadrature phase relation in both amplifying means, degenerative means coupled to both of said amplifying means to degenerate variations having the same polarity in the two amplifying means, and means to derive a synchronously detected output signal from an output terminal of at least one of said amplifying means, said synchronous detector being devoid of an oscillation sustaining feedback loop.

15. A synchronous detector for demodulating a modulated input signal including a carrier frequency component and sideband components, comprising, two amplifying means each having inputs and outputs, a first coupling circuit arranged to couple said input signal to inputs of both of said amplifying means, an output circuit coupled to outputs of both of said amplifying means to provide an amplified signal including at least the carrier frequency component of said input signal, a second coupling circuit arranged to couple said amplified signal from said output circuit to inputs of both of said amplifying means, at least one of said output and said second coupling circuits being sharply tuned to said carrier frequency, one of said first and second coupling circuits being constructed to couple the corresponding signal in the same phase to both of the amplifying means, and the other of said coupling circuits being constructed to couple the corresponding signal in opposite phases to the two amplifying means, degenerative means coupled to both of said amplifying means to degenerate variations having the same polarity in the two amplifying means, and means to derive a synchronously detected output from at least one of said amplifying means, said synchronous detector being devoid of an oscillation sustaining feedback loop.

16. A synchronous detector for demodulating a modulated input signal including a carrier frequency component and sideband components, comprising, two amplifying means each having inputs and outputs, a first coupling circuit arranged to couple said input signal to inputs of both of said amplifying means, an output circuit coupled to outputs of both of said amplifying means to provide an amplified signal including at least the carrier frequency component of said input signal, a second coupling circuit arranged to couple said amplified signal from said output circuit to inputs of both of said amplifying means, one of said first and second coupling circuits being constructed to couple the corresponding signal in the same phase to both of the amplifying means, and the other of said coupling circuits being constructed to couple the corresponding signal in opposite phases to the two amplifying means, degenerative means coupled to both of said amplifying means to degenerate modulation frequency components having the same polarity in the two amplifying means, and means to derive a synchronously detected output from at least one of said amplifying means, said synchronous detector being devoid of an oscillation sustaining feedback loop.

17. Means to demodulate a modulated input signal including a carrier frequency component and sideband components, comprising, two amplifying means having inputs and outputs, a first coupling means to apply said input signal to inputs of both of said amplifying means, means to derive a combined amplified output from outputs of both of said amplifying means, a second coupling means to apply said amplified output back to inputs of said two amplifying means, one of said first and second coupling means being constructed to apply the corresponding signal in the same phase to both amplifying means, and the other being constructed to apply the corresponding signal in opposite phases to the two amplifying means, degenerative means by-passed for carrier frequency components, means coupling said amplifying means in parallel with said degenerative means to degenerate variations having modulation frequency components and having the same polarity in the two amplifying means, and means to derive a synchronously detected output from at least one of said amplifying means, said synchronous detector being devoid of an oscillation sustaining feedback loop.

18. A synchronous detector for demodulating a modulated input signal including a carrier frequency component and sideband components, comprising, two amplifying means each having input terminals and output terminals, a first coupling circuit arranged to couple said input signal to input terminals of both of said amplifying means, an output circuit coupled to output terminals of both of said amplifying means to provide an amplified signal including at least the carrier frequency component of said input signal, a second coupling circuit arranged to couple said amplified signal from said output circuit to input terminals of both of said amplifying means, said first coupling circuit being constructed to couple the input signal in opposite phases to the two amplifying means, said second coupling circuit being constructed to couple the amplified signal in the same phase to both of the amplifying means, said second coupling circuit being additionally constructed to couple the amplified signal to the amplifying means so that the amplified signal and the input signal are in anti-quadrature phase relation in both amplifying means, degenerative means coupled to both of said amplifying means to degenerate variations having the same polarity in the two amplifying means, an automatic gain control circuit having an input coupled to said degenerative means, and means to derive a synchronously detected output from at least one of said amplifying means, said synchronous detector being devoid of an oscillation sustaining feedback loop.

References Cited in the file of this patent

UNITED STATES PATENTS

| | | |
|---|---|---|
| 1,847,190 | Marrison | Mar. 1, 1932 |
| 1,928,197 | Braden | Sept. 26, 1933 |
| 2,050,963 | Conklin | Aug. 11, 1936 |
| 2,479,290 | Bradley | Feb. 14, 1950 |
| 2,497,290 | Bradley | Feb. 14, 1950 |
| 2,571,957 | Single | Oct. 16, 1951 |
| 2,647,207 | Hawkins | July 28, 1953 |
| 2,789,219 | Butler | Apr. 16, 1957 |